UNITED STATES PATENT OFFICE.

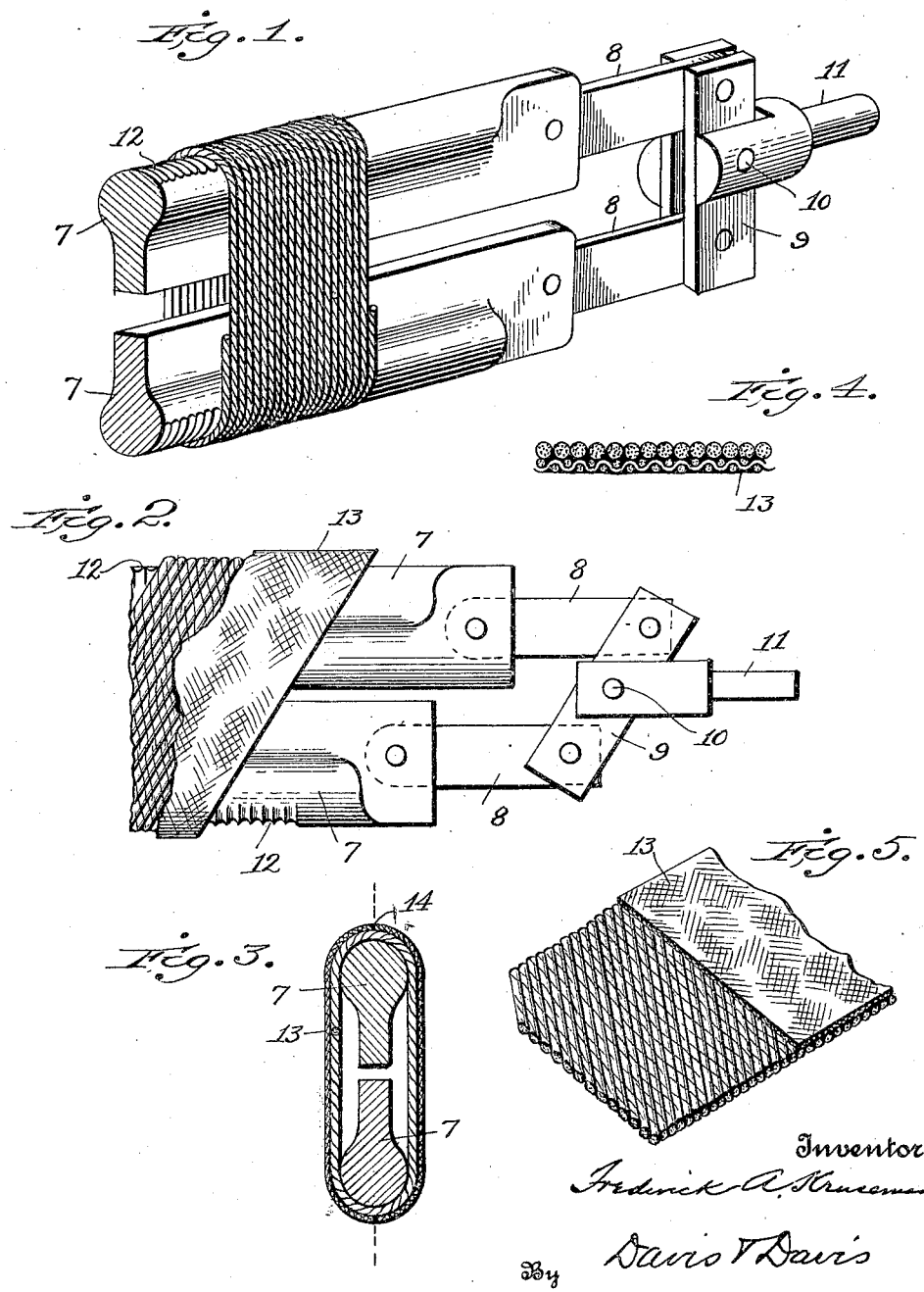

FREDERICK A. KRUSEMARK, OF ROANOKE, VIRGINIA, ASSIGNOR TO K. F. & C. TIRE & RUBBER CORPORATION, OF ROANOKE, VIRGINIA, A CORPORATION OF VIRGINIA.

METHOD OF MAKING RUBBERIZED TIRE FABRIC.

1,422,451.  Specification of Letters Patent.  Patented July 11, 1922.

Application filed December 13, 1920. Serial No. 430,440.

*To all whom it may concern:*

Be it known that I, FREDERICK A. KRUSEMARK, a citizen of the United States of America, and a resident of Roanoke, county of Roanoke, and State of Virginia, have invented certain new and useful Improvements in Methods of Making Rubberized Tire Fabric, of which the following is a full and clear specification.

The object of this invention is to provide a simple method of making a two-ply fabric for use in the manufacture of rubber tires, the fabric consisting of a layer of open-weave fabric and a layer of cord-fabric, the two fabrics being rubberized so as to adhere together and the cords being arranged so as to run diagonally of the fabric, as is desirable in this class of rubberized fabric, as more fully hereinafter set forth.

In the drawing—

Fig. 1 is a perspective view of a mandrel or core employed in carrying out the first step of my method;

Fig. 2 is a side elevation of the same showing the second step in the process;

Fig. 3 is a transverse section through the core showing the two-ply fabric completed on the core, ready for slitting and removal;

Fig. 4 is an enlarged cross-section of a piece of the two-ply fabric I produce by my method.

Fig. 5 is a perspective view of a section of the finished fabric with a part of the open-weave fabric cut away.

In carrying out my method, I employ a suitable collapsible mandrel or core, preferably a mandrel such as shown in my drawing, which consists of a pair of bars 7 pivotally connected at their ends by links 8 to a connecting-bar 9 which in turn is pivotally connected at 10 to a supporting spindle 11, one of the spindles being, of course, arranged at each end of the mandrel so as to permit the same to be rotated. The bars 7 are rounded along their outer edges and are desirably provided with transverse grooves 12 in which the strands of cord lie when wound upon the mandrel.

The cord is wound in a single layer upon the mandrel, as shown in Fig. 1, the strands of the cord lying in contact and being rubberized to cause them to adhere to each other. The cord is wound on the mandrel while the same is extended, as shown in Fig. 1, and after the cords are thus wound, the mandrel is collapsed by moving one of the bars 7 in one direction and the other bar 7 in the opposite direction, as shown in Fig. 2, to thereby shift the cords to oblique position with reference to the mandrel. After the cord-coil is thus shifted to bring the coil to an angular position, a piece of rubberized open-weave fabric 13 is wrapped around the coil of cords, its edges being brought together along the outer side of one of the bars 7, as at 14 in Fig. 3. The fabric is pressed closely onto the cords so as to adhere firmly thereto throughout its entire area and so as to cover all the outer side of the cord-coil. After the two-ply rubberized tube is thus formed, the tube is slitted longitudinally, preferably at two points, say at 14 and at a point diametrically opposite line 14, as shown in dotted lines in Fig. 3. This slitting of the fabric permits it to be readily removed from the mandrel in two pieces, each of which consists of one layer of diagonally-running cords and a layer of open-weave fabric. These fabrics are made in comparatively long and narrow strips, so that they will be ready for building into a tire. In the long strip thus formed, the cords will run transversely on oblique lines, so that in the resultant tire the cords will be properly positioned in the tire carcass.

My process is desirable because it enables the use of regulation high-grade cord, as distinguished from the cord-fabric used in the popular cord tires of today. This is desirable owing to the fact that cord-fabric costs considerably more per pound than the regular cord of same quality. Also, a regulation building machine can be used in handling the prepared strips of two-ply fabric, which it is impossible to do in a satisfactory way with regular cord-fabric now on the market.

Another advantage is that the cord-strands are equally tensioned and spaced as a result of my method, and, consequently, the possibility of building a high-grade cord tire without the necessity of employing an air-bag is considerably enhanced as compared with a regular cord-fabric where an air-bag is not used, for, as is well known, the strands of cord in regular cord-fabric are not equally tensioned and spaced in the plies when they are ready for use in building.

The nature and scope of the invention having been thus indicated and its preferred embodiment having been specifically described, what is claimed as new is:

1. The method herein described of making a two-ply rubberized fabric for tires consisting in winding a cord in the form of a flat coil, the strands being rubberized and brought in contact, then simultaneously shifting the ends of the coil in opposite directions to thereby angularize the coil, then applying rubberized woven fabric to the opposite sides of the tubular coil thus formed, and then slitting the tube longitudinally to permit its removal from the core on which it is wound.

2. The method herein described of making a two-ply tire fabric consisting in first making a flat tube of coiled cord, with the cords running diagonally, then applying an open-weave fabric to the outer face of the tube thus formed, and then longitudinally slitting the tube to form a fabric having one layer consisting of diagonally-arranged cords and the other layer of open-weave fabric.

3. The method herein described of making two-ply tire fabric consisting in winding a cord on a collapsible mandrel in the form of a flat tube, then shifting the mandrel members in opposite directions to thus move the cords into oblique relation to the mandrel, then applying a sheet of material to the outer face of the cord-coil thus formed to bind all the coils in their diagonal position with reference to each other and to said material, and then slitting the tube thus formed to enable it to be removed from the mandrel.

In testimony whereof I hereunto affix my signature.

FREDERICK A. KRUSEMARK.